United States Patent [19]
White

[11] 3,817,633
[45] June 18, 1974

[54] SPECTRORADIOMETRIC APPARATUS AND METHOD FOR MEASURING RADIATION

[76] Inventor: John U. White, 80 Lincoln Ave., Darien, Conn. 06902

[22] Filed: Aug. 2, 1972

[21] Appl. No.: 277,390

[52] U.S. Cl.............. 356/97, 356/93, 356/101
[51] Int. Cl.............................................. G01j 3/42
[58] Field of Search ...... 356/79, 85, 86, 88, 93–101

[56] References Cited
UNITED STATES PATENTS

| | | | |
|---|---|---|---|
| 2,975,669 | 3/1961 | Jarrell et al. | 356/79 |
| 3,131,349 | 4/1964 | Cary et al. | 356/94 X |
| 3,247,759 | 4/1966 | Saunderson | 356/86 X |

FOREIGN PATENTS OR APPLICATIONS

| | | | |
|---|---|---|---|
| 503,167 | 4/1939 | Great Britain | 356/101 |
| 1,495,390 | 9/1967 | France | 356/85 |

Primary Examiner—Ronald L. Wibert
Assistant Examiner—F. L. Evans
Attorney, Agent, or Firm—Curtis, Morris & Safford; Lee C. Robinson, Jr.

[57] ABSTRACT

A spectroradiometer having two detectors and a pair of monochromator channels for measuring the intensity of light emitted from an unknown source. One of the monochromator channels is illuminated with light from a reference source, and a fraction of the resulting monochromatic beam is received by the first detector to produce a reference signal. Another fraction of the monochromatic beam is combined with light from the unknown source by directing the two to opposite sides of a rotating chopper and then alternately through the other monochromator channel to the second detector. The second detector produces successive signals respectively corresponding to the intensity of the light from the unknown source and the intensity of the light from the reference source. The ratio between these signals is multiplicatively combined in an electrical circuit with the reference signal from the first detector, thus providing a measurement of the unknown intensity. In cases in which conventional detectors are employed, certain preferred embodiments of the invention include an additional chopper for the light illuminating the monochromator channels to enable a correction for background or dark signals from the detectors.

29 Claims, 5 Drawing Figures

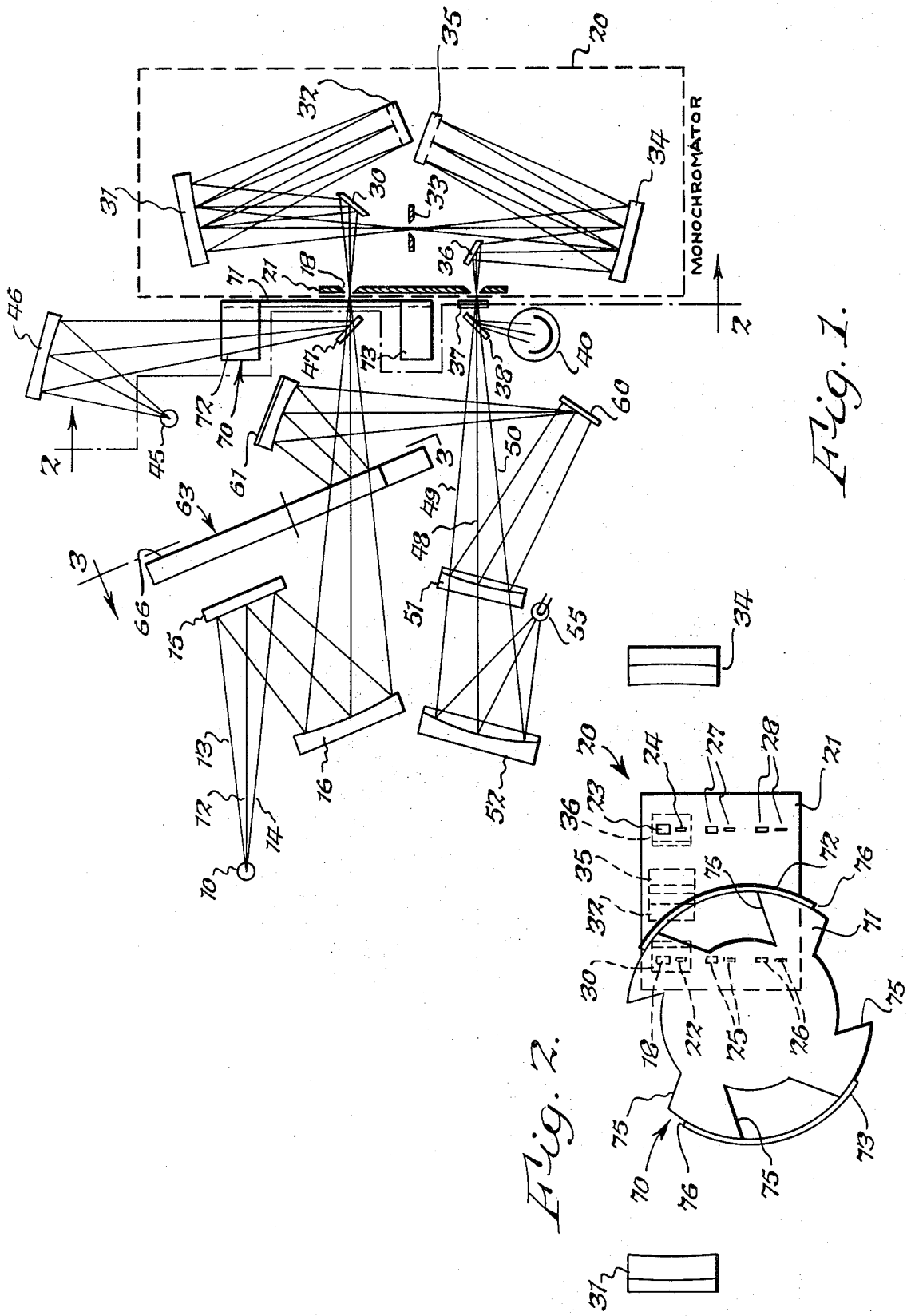

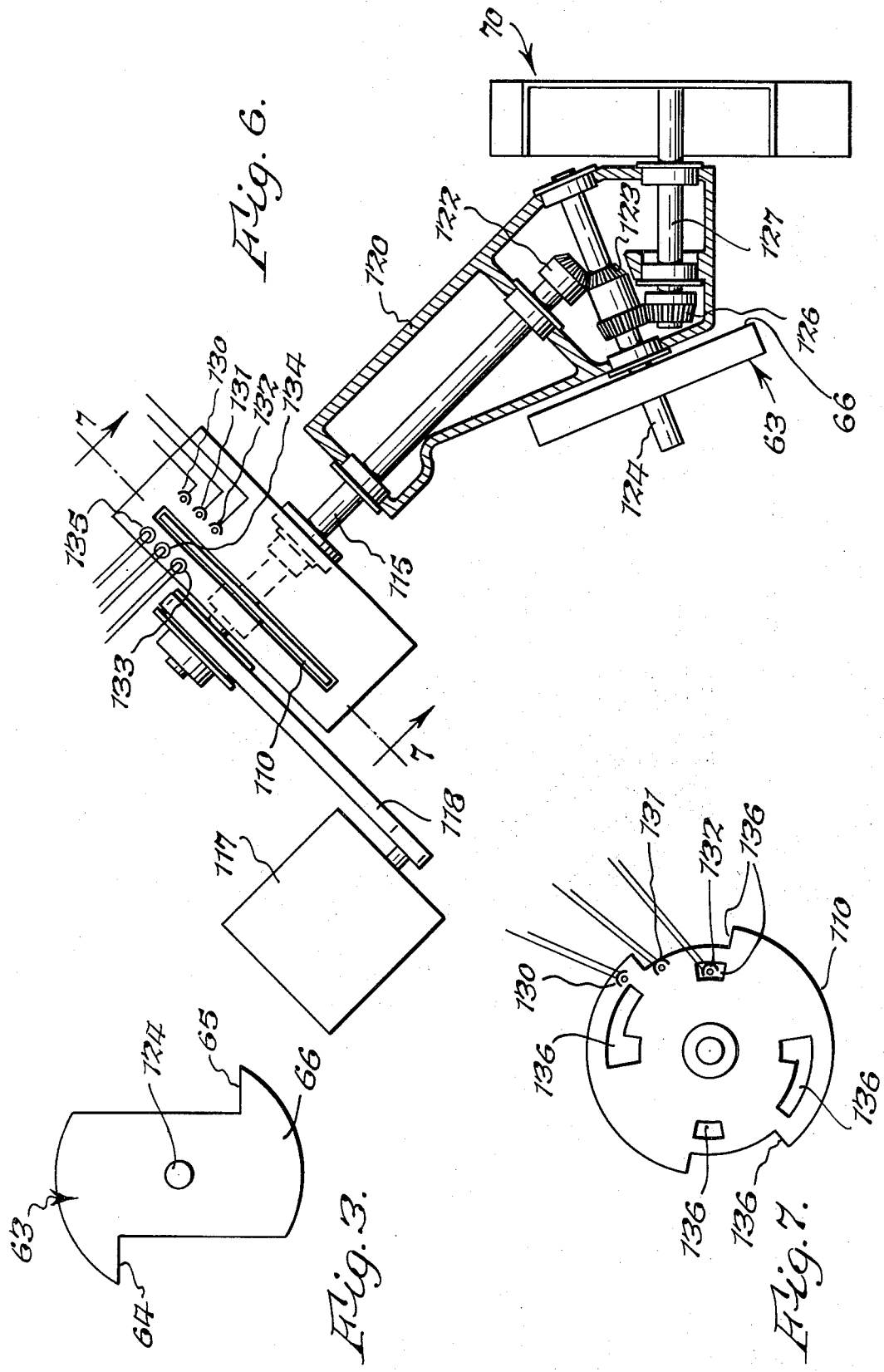

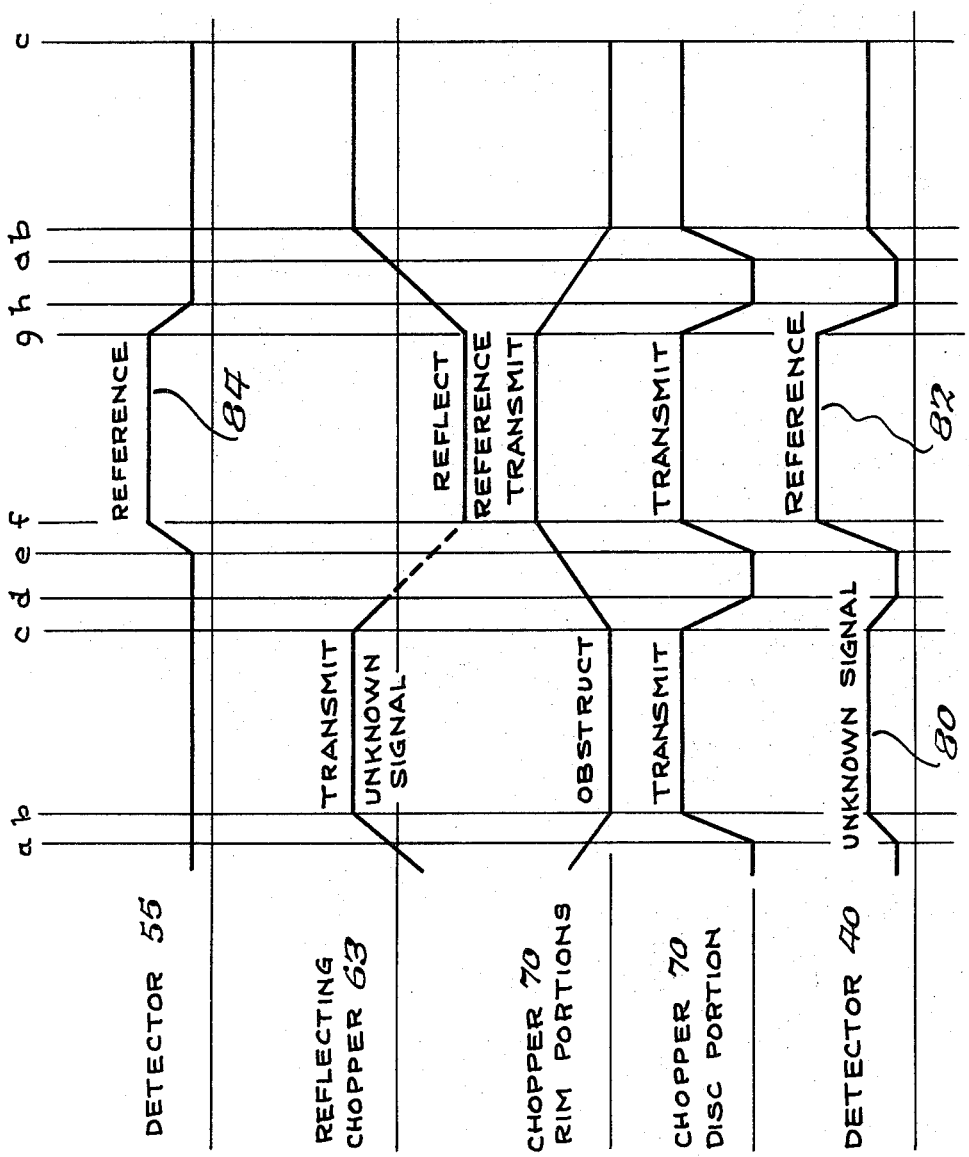

_3,817,633_

SPECTRORADIOMETRIC APPARATUS AND METHOD FOR MEASURING RADIATION

BACKGROUND OF THE INVENTION

This invention relates to radiometry and more particularly to an apparatus and method for measuring radiation from a low intensity source having an unknown intensity distribution.

In the making of radiometric measurements, it is customary to compare the emitted radiation from a source of unknown intensity at each wavelength to that from a standard or reference source of known intensity distribution. The two sources are simply interchanged in front of a monochromator and detector in such a way that no other parts of the system are altered. The method is convenient, requiring only that the same apertures of the monochromator be filled by both sources. It is independent of the transmission of the monochromator and of the wavelength response function of the detector because both are effectively standardized at every reading of the standard source.

The ultimate standard in such measurements is the radiant emission from a black body source held at a known temperature, such as a hollow cavity immersed in a bath of liquid platinum at its melting point. The emission of this source may be calculated exactly from the Planck radiation formula at particular wavelengths, but it is too cumbersome and expensive to use in routine measurements. Instead, special tungsten ribbon filament light bulbs commonly are calibrated against the cavity source and then used as secondary standards to calibrate tertiary or even more remote standards for routine use. The calibration is valid, however, only in the wavelength range where the cavity source emits usable amounts of radiation. With careful handling the accuracy of the tungsten standards can be maintained for considerable periods of time in the visible, near ultraviolet and infrared parts of the spectrum.

The range of radiometric measurements has been extended beyond the limits of the cavity source by measuring the output of a tungsten standard source with a black detector whose response has been tested for uniformity in the range of the black cavity source. By extrapolating the response of the detector on the basis of measurements of its reflectivity, the standard tungsten bulbs may be calibrated to provide reasonably close approximations outside the range of the cavity source. Here again, however, the tungsten bulbs reach a point where the emitted radiation is too small to be usable with conventional equipment. Their range may be extended somewhat by recalibrating at a higher temperature, but both the life and the stability of the bulbs drop rapidly as the temperature rises. Moreover, beyond a certain wavelength there is no appreciable emission from tungsten even at its melting point.

In the ultraviolet region beyond the limit of tungsten bulbs the positive crater of a carbon arc is a possible but even less satisfactory standard source for many types of instruments. Its range is also limited, and its stability is much worse than that of the tungsten filament.

Previous attempts to improve the performance of radiometric instruments by controlling other parameters of the system likewise met with only limited success. As a result, the systems presently available have exhibited one or more of the problems of instability, low sensitivity outside a fairly limited range, short operating life, high cost, etc.

SUMMARY

One general object of this invention, therefore, is to provide a new and improved apparatus and method for measuring radiation from an unknown source, particularly one of low intensity. As used herein and in the appended claims, the term "unknown source" refers to a radiation source of unknown intensity at the particular wavelengths of interest.

More specifically, it is an object of the invention to provide an apparatus and method of the character indicated in which variations in the intensity and stability of the reference source have little or no effect on the accuracy of the measurements.

Another object of the invention is to provide such apparatus and method of substantially improved sensitivity.

Still another object of the invention is to provide apparatus for the direct measurement of radiation in the same units in which the reference detector is calibrated.

A still further object of the invention is to provide radiometric apparatus utilizing comparatively simple optical components which is economical to manufacture and thoroughly reliable in operation.

The foregoing objects are achieved, in accordance with the present invention, by utilizing a pair of monochromator channels, which may comprise separate monochromators or be located in a single unit, in combination with an optical system of unique design. In a preferred embodiment of the invention, radiation from a reference source, which need not be of known intensity, is passed through one of the monochromator channels to produce a monochromatic reference beam. This beam is divided into two separate beams by a beam splitter. Radiation from one of the separated beams is measured by a black detector whose sensitivity is known at the wavelengths of interest. The remaining beam is directed to a diffuse reflector which converts the incident beam into scattered depolarized light. A portion of the scattered light is collected and directed to one side of a reflecting chopper, while the other side of the chopper receives radiation from a test source having the unknown intensity to be measured. The chopper is arranged to alternately illuminate the second monochromator channel with radiation from the unkown source and with radiation from the reference source. The resulting monochromatic beam is detected by a single highly sensitive detector to produce successive signals respectively corresponding to the unknown and reference intensities, and the ratio between these signals is a measure of the relative intensities at the wavelength to which the monochromatic system is responsive. The product of this ratio and the reference signal from the black detector is a measure of the unknown intensity.

The primary function of the reference source is to enable simultaneous calibration measurements on the two detectors. Thus, its intensity and stability are of little moment. Moreover, by making the losses along the different radiation paths equivalent, the unknown intensity can be made to appear directly in the same units for which the black detector is calibrated.

In certain advantageous embodiments an additional chopper is employed to correct for background or dark signals from the detectors. The chopper is located immediately adjacent the entrance slits of the two monochromator channels in position to simultaneously interrupt the radiation in both channels at regular intervals. During the interruptions the signals from the detectors are measured and are used to provide the desired correction.

The present invention, as well as further objects and advantages thereof, will be understood more clearly and fully from the following description of a preferred embodiment, when read with reference to the accompanying drawings.

BRIEF DESCRIPTION OF THE DRAWINGS

FIG. 1 is a simplified schematic plan view, with portions shown in section, of radiation measuring apparatus in accordance with an illustrative embodiment of the invention for carrying out the method of the invention.

FIG. 2 is a partially schematic elevational view of one of the choppers for the apparatus, together with a monochromator slit plate and associated optics, as seen from the line 2—2 in FIG. 1.

FIG. 3 is a partially schematic elevational view of another of the choppers as seen from the line 3—3 in FIG. 1.

FIG. 4 is a diagrammatic representation of the timed relationship between the choppers and the detector outputs for the apparatus.

FIG. 6 is a horizontal sectional view of the chopper drive mechanism.

FIG. 7 is a partially schematic elevational view of a further chopper as seen from the line 7—7 in FIG. 6.

DESCRIPTION OF A PREFERRED EMBODIMENT

Figure 5:
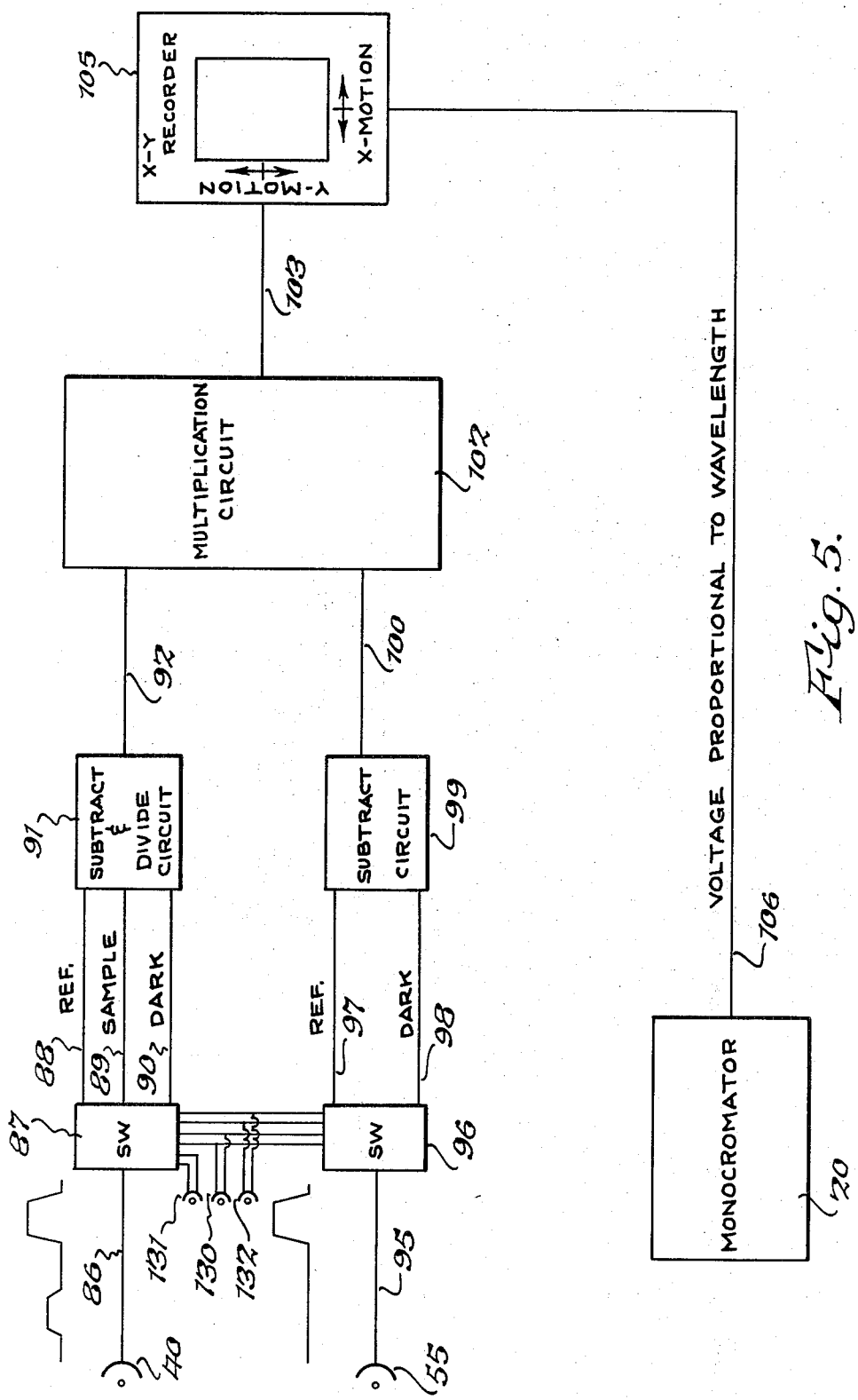
FIG. 5 is a schematic block diagram of the electrical circuit for the apparatus.

In the embodiment of the invention shown in FIG. 1, the light to be measured emanates from an unknown source indicated schematically at 10. This light (visible or invisible) may be derived from or affected by a sample, the emission characteristics of which are to be determined. For example, the sample itself may be caused to radiate, or light may be passed through it. The instrument is designed to measure the intensity of the light from the source at a given wavelength.

The light from the source 10 comprises radiant energy, the path of which is represented schematically in FIG. 1 by a principal ray 12 and two side rays 13 and 14. The light is collected by a flat mirror 15 and is reflected onto a focusing mirror 16. It will be noted that the angles of incidence of the light at the mirrors 15 and 16 are equal and illustratively are each 22.5 degrees, for purposes that will become more fully apparent hereinafter.

The mirror 16 focuses the light onto an entrance slit 18 of a dual-channel monochromator 20. As best illustrated in FIG. 2, the monochromator 20 is provided with a plate 21 having, in addition to the entrance slit 18, another entrance slit 22 for the second channel and a pair of corresponding exit slits 23 and 24. The plate 21 includes additional pairs of entrance slits 25 and 26 and exit slits 27 and 28 of various widths to provide a choice of slits and thus obtain the optimum combination of intensity and resolution for the making of a particular measurement. Alternatively, the widths of the slits may be made adjustable to provide an even wider choice of slit widths. The two monochromator channels are set to isolate light of the same wavelength in accordance with the measurement being made.

The light entering the monochromator entrance slit 18 is reflected by a flat directional mirror 30 and a spherically concave collimating mirror 31 onto a reflection grating 32. The light is then returned to the collimating mirror 31 and proceeds through an intermediate aperture or slit 33 to a second spherically concave collimating mirror 34 and a second reflection grating 35. From the grating 35 the light is returned to the collimating mirror 34 and then to a flat directional mirror 36 leading to the exit slit 23.

It will be noted that the collimating mirrors 31 and 34 and the gratings 32 and 35 are arranged as a double Littrow monochromator, with the second monochromator off-set with respect to the first monochromator. In the particular positions shown in FIG. 1, the collimator 34, the grating 35 and the directional mirror 36 are closer to the plate 21 than the collimator 31, the grating 32 and the directional mirror 30. In cases in which the collimators are spherical, the mirrors and gratings are located such that the principal light ray first approaching each collimator is closer to the collimator's center of curvature than the principal light ray last leaving the collimator. That is, the entering light beam is closer to the center of curvature than the exiting monochromatic beam. More generally, the principal ray first approaching each collimator is between the grating or other dispersing means and the principal ray last leaving the collimator, and the optical locations of the entrance slit 18 and the exit slit 23 are on opposite sides of the intermediate slit 33. With this arrangement, as the gratings are pivoted to change the wavelength, the width of the image at the exit slit 23 remains the same, and the deleterious effects of grating magnification are avoided. The monochromator provides unit magnification for both channels throughout all grating angles for which the instrument is designed, and it is also corrected for coma at all wavelengths.

The monochromatic beam of light emerging from the exit slit 23 passes through a filter 37 and is reflected by a directional mirror 38 to a photoelectric detector 40. The detector 40 preferably is of a type which exhibits high sensitivity at the particular wavelengths of interest.

The sample light received by the detector 40 is compared with a reference beam which originates at an auxiliary source 45. Light from the source 45 is brought to a focus on the second channel entrance slit 22 (FIG. 2) of the monochromator 20 by a concave mirror 46 and a flat directional mirror 47. The light emerges from the second channel exit slit 24 in the form of a monochromatic reference beam which is represented in FIG. 1 by a principal ray 48 and two side rays 49 and 50.

The monochromatic beam from the slit 24 passes through the same filter 37 used for the sample beam and then to a beam splitter 51. The splitter illustratively is in the form of a mirror perforated with a large number of conical holes, or it may comprise a series of spaced bars having reflective surfaces facing the incoming light. A portion of the light passes through the splitter and is reflected diagonally upward by a concave mirror 52 at a 15 degree angle of incidence. The reflected light is received by a black detector 55 of known sensitivity. The detector 55 is of conventional design and illustratively may be a thermocouple, bolometer or other detector whose response is substantially independent of wavelength. Another particularly useful detector is a so-called "quantum counter," such as a photomultiplier tube which receives the light from a solution of rhodamine or other suitable fluorescent dye. Detectors of this type exhibit a comparatively constant quantum efficiency throughout a large portion of the spectrum.

A fixed fraction of the monochromatic reference beam represented by the rays 48, 49 and 50 is diverted by the beam splitter 51 diagonally upward in the same direction and at the same 15.0 degree angle of incidence as the beam diverted to the reference detector 55. The splitter 51 directs the monochromatic light to a diffuse reflector 60. The reflector 60 includes a uniform white reflective surface, such as barium sulfate or magnesium oxide, that exhibits high reflectance throughout the spectral range of interest. The reflector serves to convert the incident beam into diffuse, depolarized light emitted in all directions, and it thus acts as an auxiliary source of reference light. In a modification of the arrangement shown in FIG. 1, the reference detector 55 may be located in position to receive its light from the reflector. In these latter embodiments the splitter 51 is replaced by a conventional directional mirror, and the mirror 52 is not used.

A portion of the scattered light from the diffuse reflector 60 is collected by a concave mirror 61 and is directed to one side of a rotating sector mirror or reflecting chopper 63. As best shown in FIG. 3, the chopper 63 includes diametrically opposed cut-outs 64 and 65, and one face of the chopper is provided with a mirror surface 66.

The reflecting chopper 63 is interposed in the light path between the concave focusing mirror 16 (FIG. 1) and the entrance slits of the monochromator 20. As the chopper 63 rotates, the sample beam from the source 10 is periodically interrupted by the face of the chopper adjacent the mirror 16 to prevent the sample beam from reaching the monochromator. The monochromatic reference beam from the diffuse reflector 60 is directed by the mirror 61 to the opposite face of the chopper, that is, the face having the mirror surface 66. The reference beam reaches the chopper at the same point where the light from the source 10 emerges through the cut-outs 64 and 65. When the solid portion of the chopper is in the light path, the chopper blocks the light from the source 10, and the mirror surface 66 reflects the reference light to the monochromator's entrance slit 18. Upon continued rotation of the chopper, the cut-outs 64 and 65 admit the source light to the entrance slit 18, while the reference light no longer is received by the slit. The arrangement is such that the entrance slit is alternately illuminated by light from the source 10 and from the monochromatic reference beam. The source light and the reference light pass successively through the same monochromator channel and are directed from the filter 37 and the mirror 38 to the same detector 40. The beam received by the detector thus comprises a monochromatic combined beam including a first portion representing the unknown intensity being measured and a second portion representing the reference or calibration intensity.

To take into account the background or dark signals from the photoelectric detectors 40 and 55, the instrument is provided with a second chopper 70. The chopper 70 is rotated at the same speed as that of the reflecting chopper 63 and is located immediately in front of the entrance slits 18 and 22 of the monochromator 20 in position to interrupt the light entering the two monochromator channels at regular intervals. As best illustrated in FIG. 2, the chopper 70 is generally in the shape of a shallow cup and includes a flat disc portion 71 and two rim portions 72 and 73. The disc portion 71 has four equally spaced openings 75 adjacent its periphery. The rim portions 72 and 73 are arranged in diametrically opposed relationship with each other to provide a pair of additional openings or gaps 76 in the rim. In the manner shown in FIG. 1, the rim portions are positioned in the path of the reference beam between the mirrors 46 and 47 to provide two interruptions of the reference beam for each revolution of the chopper.

The timing of the reflecting chopper 63, the rim portions 72 and 73 of the chopper 70, and the disc portion 71 of the chopper 70, is synchronized in the manner illustrated by the successive curves shown in FIG. 4. The distance between point $a$ in this figure and the succeeding point $a$ represents one-half revolution of the choppers. At point $a$ the rim portion of chopper 70 is closing, the chopper 63 is opening, and the disc portion of the chopper 70 is beginning to open. At point $b$, the rim portion of chopper 70 is completely closed, and the chopper 63 and the disc portion of chopper 70 are both completely open. They remain so until reaching point $c$ to transmit the unknown light to the monochromator 20. During this interval, a current signal 80 corresponding to the unknown intensity appears at the output of the detector 40. The rim of the chopper 70 continuously obstructs the reference light between the mirrors 46 and 47 as the chopper moves between point $b$ and point $c$, thus positively preventing the reference light from affecting the unknown signal.

At point $c$, the chopper 63 starts to close, and the rim portion of chopper 70 starts to open, each completing its change at at point $f$. Simultaneously, at point $c$ the disc portion of the chopper 70 starts to close, becoming completely closed at point $d$ and remaining closed until point $e$. During this interval no light enters the monochromator, and the current signal at the output of the detector 40 corresponds to the dark current. At point $e$, the disc portion of chopper 70 starts to open, becoming completely open at point $f$.

From point $f$ to point $g$ the chopper 63 remains closed, and both portions of the chopper 70 remain open. During this interval the mirror surface 66 of the chopper 63 reflects the reference beam from the mirror 61 and directs it to the monochromator entrance slit 18. Between points $f$ and $g$ the detector 40 produces a current signal 82 representative of the detected radiation from the reference source 45 after its successive traversal of both channels of the monochromator 20. During this same interval the detector 55 produces a current signal 84 which is representative of the reference source after its traversal of the lower channel of the monochromator.

At point $g$ the chopper 63 again begins to open. Simultaneously, the rim and disc portions of the chopper 70 begin to close and reach their fully closed positions at points $b$ and $h$, respectively. Between points $h$ and $a$ all light is again blocked from the monochromator entrance slits 18 and 22. Between points $a$ and $b$ the disc portion of the chopper 70 reopens, the chopper 63 reaches its fully open position, and the rim portion of chopper 70 reaches its fully closed position to repeat the cycle.

The arrangement is such that the lower channel of the monochromator 20 is periodically illuminated with light from the reference source 45 at a frequency determined by the chopper 70 to produce a reference signal 84 of corresponding frequency at the detector 55. The upper channel of the monochromator is alternately illuminated with monochromatic reference light from the diffuse reflector 60 and with light from the source 10. The resulting variable beam from the upper channel is received by the detector 40 to produce successive signals 80 and 82 respectively representative of the reference intensity and of the unknown intensity. As will be understood, during the intervals in which the choppers prevent light from reaching the monochromator, the two detectors produce dark or background signals.

The photoelectric detectors 40 and 55 are connected in an electrical circuit shown schematically in FIG. 5. The varying signal from the detector 40 is transmitted over a lead 86 to a switching circuit 87. The circuit 87 is effective to separate the reference portion, the sample portion and the dark portion of the incoming signal and to apply the separated portions to respective leads 88, 89 and 90. The separated portions of the signal are received by a circuit 91 which operates in known manner to subtract the dark signal on the lead 90 from the reference and sample signals on the leads 88 and 89 and to then divide the sample signal by the reference signal. The signal appearing on the output lead 92 from the circuit 91 thus corresponds to the ratio of the net sample signal to the net reference signal.

The signal from the reference detector 55 is transmitted over a lead 95 to a second switching circuit 96. The circuit 96 serves to separate the reference signal from the dark or no-input signal of the detector 55 and to apply the respective signals to output leads 97 and 98. These leads are connected to a circuit 99 in which the dark signal is subtracted from the reference signal. The resulting net reference signal is sent out over an output lead 100.

The signals on the leads 92 and 100 are received by a multiplication circuit 102. The circuit 102 is effective to multiply the two signals to produce an output signal on a lead 103 corresponding to the product of the ratio of the sample to the reference signal from the lead 92 and the reference signal from the lead 100. As indicated heretofore, the diffuse reflector 60 (FIG. 1) exhibits high reflectance throughout the spectral range of interest. Accordingly, for practical purposes variations in its reflectivity may be disregarded, and the reflector may be considered as a light source having an intensity that is accurately proportional to the intensity of the light reaching the reference detector 55. The unknown intensity of the sample light from the source 10 is thus equal to the output signal from the reference detector multiplied by the ratio of the unknown intensity signal from the detector 40 to the reference signal from the detector 40. The signal on the lead 103 corresponds to this product and constitutes an extremely accurate representation of the sample intensity which is independent of the intensity of the reference source.

The output signal on the lead 103 is applied to the y-axis input terminal of a recorder 105. The x-axis input terminal of the recorder receives a voltage over a lead 106 from the monochromator 20 which is proportional to the particular wavelength being measured. The recorder thus produces a continuous graph of the intensity of the sample with respect to wavelength.

FIG. 6 is illustrative of a suitable drive mechanism for the various choppers. In addition to the choppers 63 and 70 described heretofore, the instrument includes a third chopper 110 which is effective to control the signal switching circuits 87 and 96 (FIG. 5). The chopper 110 is affixed to a drive shaft 115. This shaft is rotated at a constant speed, illustratively 1,800 rpm, by an electric motor 117 and a belt 118. The shaft extends into a housing 120 and is provided with a bevel gear 122 within the housing. The gear 122 is in meshing engagement with a bevel gear 123 on a shaft 124 which supports the reflecting chopper 63. The shaft 124 carries an additional bevel gear which meshes with a bevel gear 126 on an angularly disposed shaft 127. This latter shaft supports the chopper 70 in the proper angular relationship with respect to the chopper 63. The various gear ratios are such that each of the choppers 63, 70 and 110 is rotated at the same speed.

The chopper 110 comprises a thin, substantially circular blade which is provided with three photoelectric cells 130, 131 and 132 on one side of the chopper and three cooperating light sources 133, 134 and 135 on the other side. As best shown in FIG. 7, the chopper 110 includes suitable openings 136 which are arranged to permit light from the sources 133, 134 and 135 to reach the corresponding photocells 130, 131 and 132 in a predetermined sequence corresponding to the particular switching function being performed by the circuits 87 and 96. In cases in which the reference signals are being measured, for example, the photocell 130 is activated to apply an enabling signal to the circuits 87 and 96, while the photocell 132 similarly applies an enabling signal to the two circuits during the measurement of the dark signals. When the sample signal is being measured, the photocell 131 applies an enabling signal to the circuit 87. The circuits 87 and 96 transmit the reference, dark and sample signals to the ensuing circuits 91 and 99 in accordance with the sequence described above.

Because the two channels of the monochromator 20 are adjusted to select light of the same wavelength, the monochromatic light that has been isolated from the reference source 45 by the lower channel (the light represented by the rays 48, 49 and 50 in FIG. 1) has the appropriate wavelength to pass freely through the upper channel. Both monochromator channels operate at unit magnification and at the same dispersion. By making the width of the upper channel exit slit 23 (FIG. 2) greater than that of the upper channel extrance slit 18 and substantially greater than those of the lower channel slits 22 and 24, all of the reference light rays entering the slit 18 emerge through the central part of the slit 23 without losses due to the slit jaws. In certain particularly advantageous embodiments, the effective width of the slit 23 is greater than the sum of the effective widths of the slits 18, 22 and 24. With this arrangement, there is no change in the spectral width of the reference light during its second traversal of the monochromator, and the wavelength distribution of the reference light reaching the detector 40 is the same as that reaching the detector 55. The relative outputs of the two detectors depend only on their relative sensitivities and on the geometry and reflection conditions of the various light paths.

In the embodiment of FIG. 1 the light path from the source 10 to the entrance slit 18 of the monochromator 20 undergoes two reflections at angles of incidence of 22.5 degrees. The light path from the diffuse reflector 60 to the slit 18 also undergoes two reflections at 22.5 degree angles of incidence. For mirrors of equal reflectivity, the light from the source 10 and the light from the reflector 60 are both attenuated by the same amount upon reaching the slit 18. Since they both traverse the same path through the monochromator, their monochromator losses are equal, and since they both have the same wavelength the sensitivty of the detector 40 is the same for both. Accordingly, if the unkown source 10 is unpolarized, the ratio of the detector outputs accurately represents the ratio between the intensity of the light from the source and that from the reflector. If the unknown source 10 is polarized, the ratio of the detector outputs accurately represents the ratio of the horizontal or vertical components of the intensity of the light from the source and from the reflector, provided a polarizer (not shown) is inserted in the beam between the chopper 63 and the slit 18 and oriented with its axis in the horizontal or vertical directions, respectively.

The reference light diverted by the beam splitter 51 to the diffuse reflector 60 is reflected at a 15 degree angle of incidence. The reference light which is not diverted is subsequently reflected by the mirror 52 at the same 15 degree angle of incidence. Accordingly, the light beams reaching the reflector 60 and the reference detector 55 are both attenuated by the same reflection losses. Thus, for equal reflectivities the ratio of the radiant energy falling on the reflector and the detector is independent of wavelength and of the state of polarization of the reference light beam leaving the exit slit 24.

The terms and expressions which have been employed are used as terms of description and not of limitation, and there is no intention in the use of such terms and expressions of excluding any equivalents of the features shown and described or portions thereof, but is recognized that various modifications are possible within the scope of the invention claimed.

I claim:

1. Apparatus for measuring radiation from an unknown source, the apparatus comprising, in combination:
   a first monochromator channel for isolating radiation of variable wavelength;
   a second monochromator channel for isolating radiation of said wavelength;
   a reference source of radiation;
   means for illuminating the first monochromator channel with radiation from the reference source, to produce a monochromatic beam;
   means for dividing the monochromatic beam into first and second reference beams;
   a first detector responsive to radiation from the first reference beam for producing a reference signal;
   an optical system for alternately directing into the second monochromator channel radiation from the unknown source and from the second reference beam, to produce a combined beam including a first portion representative of the unknown source and a second portion representative of the reference source, the first and second reference beams and the radiation from the unknown source being subjected to compensating losses in transmission along their respective paths to the first detector and to the second monochromator channel;
   a second detector responsive to radiation from the combined beam for producing successive signals respectively corresponding to the first and second portions thereof; and
   means responsive to both the reference signal and the successive signals for producing an accurate indication of the intensity of the unknown source.

2. Apparatus as defined in claim 1, in which each of the monochromator channels has an entrance slit and an exit slit, the effective width of the exit slit for the second monochromator channel being greater than the combined effective widths of each of the three other slits.

3. Apparatus as defined in claim 2, in which each monochromator channel operates at unit magnification and at the same dispersion, the width of the exit slit for the second monochromator channel being greater than the sum of the widths of the three other slits.

4. Apparatus for measuring radiation from an unknown source, the apparatus comprising, in combination:
   first and second monochromator channels for isolating radiation of variable wavelength;
   a reference source of radiation;
   means for illuminating the first monochromator channel with radiation from the reference source, to produce a monochromatic reference beam;
   an optical system for alternately directing into the second monochromator channel radiation from the unknown source and from the reference source, to produce a monochromatic combined beam including a first portion representative of the unknown source and a second portion representative of the reference source:
   a first detector of known sensitivity, the first detector being responsive to radiation from the reference beam for producing a reference signal;
   a second detector responsive to radiation from the combined beam for producing successive signals respectively corresponding to the first and second portions thereof; and
   electrical circuit means for forming the ratio between the signals respectively corresponding to the first and second portions of the combined beam and for multiplicatively combining said ratio with the reference signal, to produce an accurate indication of the intensity of the unknown source.

5. Apparatus for measuring radiation from an unknown source, the apparatus comprising, in combination:
   a first monochromator channel for isolating radiation of variable wavelength;
   a second monochromator channel for isolating radiation of said wavelength;
   a reference source of radiation;
   means for illuminating the first monochromator channel with radiation from the reference source, to produce a monochromatic beam;
   means for dividing the monochromatic beam into first and second reference beams, said last-mentioned means having radiation depolarizing means and means for forming the second reference beam from the depolarized radiation;

a first detector responsive to radiation from the first reference beam for producing a reference signal;

an optical system for alternately directing into the second monochromator channel radiation from the unknown source and from the second reference beam, to produce a combined beam including a first portion representing the unknown source and a second portion representing the reference source;

a second detector responsive to radiation from the combined beam for producing successive signals respectively corresponding to the first and second portions thereof; and means responsive to both the reference signal and the successive signals for producing an accurate indication of the intensity of the unknown source.

6. Apparatus for measuring radiation from a source having an unknown intensity, the apparatus comprising, in combination:

a first monochromator channel for isolating radiation of a given wavelength;

a second monochromator channel for isolating radiation of said wavelength;

a reference source of radiation;

means for illuminating the first monochromator channel with radiation from the reference source, to produce a monochromatic beam;

means including a beam splitter for dividing the monochromatic beam into first and second reference beams, and including radiation depolarizing means and means for forming the second reference beam from the depolarized radiation;

a first detector responsive to radiation from the first reference beam for producing a reference signal;

an optical system for alternately directing into the second monochromator channel radiation from the source having the unknown intensity and from the second reference beam, to produce a combined beam including a first portion representative of the unknown intensity and a second portion representative of the intensity of the reference source;

a second detector responsive to radiation from the combined beam for producing successive signals respectively corresponding to the first and second portions thereof; and electrical circuit means for forming the ratio between the signals respectively corresponding to the first and second portions of the combined beam and for multiplicatively combining said ratio with the reference signal, to produce an accurate indication of the intensity of the unknown source.

7. Apparatus as defined in claim 6, in which each of the monochromator channels has an entrance slit and an exit slit, the effective width of the exit slit for the second monochromator channel being greater than the combined effective widths of each of the three other slits.

8. Apparatus as defined in claim 7, in which each monochromator channel operates at unit magnification and at the same dispersion, the width of the exit slit for the second monochromator channel being greater than the sum of the widths of the three other slits.

9. Apparatus for measuring radiation from an unknown source, the apparatus comprising, in combination:

a reference source of radiation;

means for isolating monochromatic radiation of variable wavelength from the reference source;

a first detector for detecting a part of the monochromatic radiation;

means for diffusing another part of the monochromatic radiation and for thereafter collecting the diffuse radiation;

monochromator means for isolating radiation of the same variable wavelength;

means for alternately applying radiation from the unknown source and the collected diffuse radiation to the monochromator means, to produce a monochromatic beam containing both the unknown radiation and the collected diffused radiation;

a second detector for detecting radiation from the monochromatic beam; and means combining the outputs of both of the detectors to form a signal representative of the ratio of the second detector output during its responsitivity to the unknown radiation to that during its responsitivity to the collected diffuse radiation multiplied by the output of the first detector.

10. Apparatus for measuring radiation from an unknown source, the apparatus comprising, in combination:

a reference source of radiation;

a monochromator for isolating radiation of variable wavelength;

means for utilizing a first part of the monochromator's optical capacity to produce monochromatic radiation from the reference source;

a first detector of known sensitivity for detecting a portion of the monochromatic radiation from the reference source;

means for diffusing another portion of the monochromatic radiation from the reference source and for thereafter collecting the diffuse radiation;

means for utilizing a second portion of the monochromator's optical capacity to monochromatize the unknown radiation and the collected diffuse radiation;

a second detector for alternatey detecting the monochromatic unknown radiation and the collected diffuse radiation; and means for forming the ratio of the output of the second detector resulting from the collected diffuse radiation to the output of the first detector resulting from the detected portion of the monochromatic radiation from the reference source and for multiplying said ratio by the output of the second detector resulting from the unknown radiation, to produce an accurate indication of the intensity of the unknown source.

11. Radiation handling apparatus comprising, in combination:

a first monochromator channel for isolating radiation of a given wavelength;

a second monochromator channel for isolating radiation of said wavelength;

a reference source of radiation;

means for illuminating the first monochromator channel with radiation from the reference source, to produce a monochromatic reference beam;

means supporting a source of radiation of unknown intensity;

an optical system including a continuously rotating sector mirror and means for directing radiation from the source having the unknown intensity and from the monochromatic reference beam to opposite sides of the mirror and then to the second monochromator channel, to produce a combined beam including a first portion representative of the unknown intensity and a second portion representative of the intensity of the reference source;

a first detector responsive to radiation from the monochromatic reference beam for producing a reference signal;

a second detector responsive to radiation from the combined beam for producing successive signals respectively corresponding to the first and second portions thereof; and electrical circuit means responsive to both the reference signal and the successive signals for producing an accurate indication of the intensity of the unknown source.

12. Radiation handling apparatus comprising, in combination:

a first monochromator channel for isolating radiation of a given wavelength;

a second monochromator channel for isolating radiation of said wavelength;

a reference source of radiation;

means for illuminating the first monochromatic channel with radiation from the reference source, to produce a monochromatic reference beam;

means for supporting a source of radiation of unknown intensity;

an optical system for alternately directing into the second monochromator channel radiation from the source having the unknown intensity and from the monochromatic reference beam, to produce a combined beam including a first portion representative of the unknown intensity and a second portion representative of the reference source;

a first detector responsive to radiation from the monochromatic reference beam for producing a reference signal;

a second detector responsive to radiation from the combined beam for producing successive signals respectively corresponding to the first and second portions thereof;

means for periodically blocking the radiation reaching the the first and second detectors, to produce background signals;

first circuit means for correcting the first and second detector signals for their corresponding background signals to respectively form a net reference signal and net successive signals; and second circuit means for forming the ratio between the net successive signals and for multiplicatively combining said ratio with the net reference signal, to produce an accurate indication of the intensity of the unknown source.

13. Apparatus for measuring radiation from a source having an unknown intensity, the apparatus comprising, in combination:

a first monochromator channel for isolating radiation of variable wavelength;

a second monochromator channel for isolating radiation of said wavelength;

a reference source of radiation;

means for illuminating the first monochromator channel with radiation from the reference source, to produce a monochromatic beam;

means for dividing the monochromatic beam into first and second reference beams;

a first detector responsive to radiation from the first reference beam for producing a reference signal;

an optical system including a reflecting chopper and means for directing radiation from the source having the unknown intensity and from the reference source to opposite sides of the chopper and then to the second monochromator channel to produce a combined beam including a first portion representative of the unknown intensity and a second portion representative of the reference source;

a second detector responsive to radiation from the combined beam for producing successive signals respectively corresponding to the first and second portions thereof;

means for periodically blocking the radiation reaching the first and second detectors, to produce background signals;

first circuit means for subtracting the background signals from the corresponding first and second detector signals to respectively form a net reference signal and net successive signals; and second circuit means for forming the ratio between the net successive signals and for multiplicatively combining said ratio with the net reference signal, to produce an accurate indication of the intensity of the unknown source.

14. Apparatus as defined in claim 13, in which the radiation blocking means comprises a rotary chopper for simultaneously blocking both of the monochromator channels at periodic intervals.

15. Apparatus as defined in claim 14, which further comprises an additional chopper for controlling the first circuit means to separate the successive signals from the second detector.

16. Radiation handling apparatus comprising, in combination:

monochromator means including first and second channels for isolating monochromatic radiation, the monochromator means having a pair of Littrow sections for successively receiving the radiation and monochromatizing the same;

a reference source of radiation;

means for illuminating the first monochromator channel with radiation from the reference source, to produce a monochromatic beam;

means for dividing the monochromatic beam into first and second reference beams, said last-mentioned means having radiation depolarizing means and means for forming the second reference beam from the depolarized radiation;

a first detector responsive to radiation from the first reference beam for producing a reference signal;

means for supporting a source of radiation of unknown intensity;

an optical system for alternately directing into the second monochromator channel radiation from the source having the unknown intensity and from the second reference beam, to produce a combined beam including a first portion representing the unknown intensity and a second portion representing the intensity of the reference source;

a second detector responsive to radiation from the combined beam for producing successive signals respectively corresponding to the first and second portions thereof; and means responsive to both the reference signal and the successive signals for producing an accurate indication of the intensity of the unknown source.

17. Radiation handling apparatus as defined in claim 16, in which the sections of said monochromator means are off-set with respect to each other.

18. Radiation handling apparatus comprising, in combination:

monochromator means including first and second Littrow sections for successively receiving a beam of radiation and monochromatizing the same, each of the sections including dispersing means, collimating means and radiation directing means, the dispersing means, the collimating means and the radiation directing means of one of the sections being off-set with respect to the dispersing means, the collimating means and the radiation directing means of the other section;

a reference source of radiation;

means for illuminating the monochromator means with radiation from the reference source, to produce a monochromatic beam;

means for dividing the monochromatic beam into first and second reference beams;

a first detector responsive to radiation from the first reference beam for producing a reference signal;

means for supporting a source of radiation of unknown intensity;

an optical system for alternately directing into the monochromator means radiation from the source having the unknown intensity and from the second reference beam, to produce a combined beam including a first portion representative of the unknown intensity and a second portion representative of the intensity of the reference source;

a second detector responsive to radiation from the combined beam for producing successive signals respectively corresponding to the first and second portions thereof; and means for forming the ratio between the signals respectively corresponding to the first and second portions of the combined beam and for multiplicatively combining said ratio with the reference signal, to produce an accurate indication of the intensity of the unknown source.

19. Radiation handling apparatus as defined in claim 18, in which each of the collimating means has a center of curvature, the beam received by each of the monochromator sections being directed from the collimating means to the dispersing means and then back to the collimating means of the corresponding section, the entering beam approaching each collimating means being closer to its center of curvature than the monochromatic exit beam leaving the collimating means.

20. Radiation handling apparatus comprising, in combination:

monochromator means including first and second Littrow sections for successively receiving a beam of radiation and monochromatizing the same, each of the sections including dispersing means, collimating means and radiation directing means, the dispersing means, the collimating means and the radiation directing means of one of the sections being off-set with respect to the dispersing means, the collimating means and the radiation directing means of the other section;

a reference source of radiation;

means for illuminating the monochromator means with radiation from the reference source, to produce a monochromatic reference beam;

a first detector responsive to radiation from the reference beam for producing a reference signal;

means for supporting a source of radiation of unknown intensity;

an optical system for alternately directing into the monochromator means radiation from the source having the unknown intensity and from the reference source, to produce a combined beam including a first portion representative of the unknown intensity and a second portion representative of the intensity of the reference source;

a second detector responsive to radiation from the combined beam for producing successive signals respectively corresponding to the first and second portions thereof;

means for periodically blocking the radiation reaching the first and second detectors, to produce background signals;

first circuit means for correcting the first and second detector signals for their corresponding background signals to respectively form a net reference signal and net successive signals; and second circuit means for forming the ratio between the net successive signals and for multiplicatively combining said ratio with the net reference signal, to produce an accurate indication of the intensity of the unknown source.

21. In radiation handling apparatus, the improvement which comprises, in combination:

first and second Littrow monochromator sections for successively receiving a beam of radiation and monochromatizing the same, each of the monochromator sections including dispersing means and collimating means having a center of curvature;

the radiation beam received by each monochromator section being closer to the center of curvature of the collimating means in that section than the radiation beam leaving the said section.

22. In radiation handling apparatus, the improvement which comprises, in combination:

first and second Littrow monochromator sections for successively receiving a beam of radiation and monochromatizing the same, each of the monochromator sections including dispersing means and collimating means, the radiation beam following a path from the first section collimating means to the dispersing means in the first section, then back to the first section collimating means, then to the collimating means in the second section, then to the dispersing means in the second section and then back to the second section collimating means;

the radiation beam first approaching each collimating means being closer to the corresponding dispersing means than the radiation beam last leaving said collimating means.

23. In radiation handling apparatus, a monochromator comprising, in combination:

means defining an entrance aperture, an exit aperture and an intermediate aperture; and first and second Littrow monochromator sections for successively receiving radiation from said entrance aperture and directing the same in monochromatic form to said exit aperture, each of the monochromator sections including dispersing means and collimating means, the radiation following a path from said entrance aperture to the first section collimating means, then to the first section dispersing means, then back to the first section collimating means, then through the intermediate aperture, than to the second section collimating means, then to the second section dispersing means, then back to the second section collimating means, and then to said exit aperture;

the entrance aperture and the exit aperture being optically on opposite sides of the radiation passing through the intermediate aperture.

24. A method of measuring radiation from a source having an unknown intensity, comprising the steps of:

isolating monochromatic radiation of variable wavelength from a reference source;

separating the monochromatic radiation into first and second reference beams;

detecting radiation from the first reference beam through the use of a first detector;

depolarizing radiation from the second reference beam;

forming an auxiliary reference beam from the depolarized radiation;

directing the auxiliary reference beam through a monochromator channel to isolate monochromatic radiation of said variable wavelength;

periodically replacing the auxiliary reference beam being directed through the monochromator channel with radiation from the source having an unknown intensity, to produce a combined monochromatic beam having an unknown component and a reference component;

detecting signals from the combined beam through the use of a second detector, said signals being respectively proportional to the unknown component and the reference component; and combining the detected signals proportional to the unknown and reference components with the detected radiation from the first reference beam to produce an accurate indication of the unknown intensity.

25. A method of measuring radiation as defined in claim 24, which further comprises:

subjecting the first and second reference beams and the radiation from the unknown source to compensating transmission losses along their respective paths.

26. A method for measuring radiation from a source having an unknown intensity, comprising the steps of:

isolating monochromatic radiation of variable wavelength from a reference source;

splitting the monochromatic radiation from the reference source into first and second reference beams;

detecting radiation from the first reference beam;

depolarizing radiation from the second reference beam;

forming an auxiliary reference beam from the depolarized radiation;

directing the auxiliary reference beam to one side of a sector mirror and then through a monochromator channel to isolate monochromatic radiation of said variable wavelength;

directing radiation from the source having the unknown intensity to the opposite side of the sector mirror, the mirror periodically replacing the auxiliary reference beam being directed through the monochromator channel with radiation from the source having an unknown intensity to produce a combined monochromatic beam having an unknown component and a reference component;

detecting signals respectively representative of the unknown component and the reference component from the combined beam;

forming the ratio between the detected signals representative of the unknown and reference components; and electrically multiplying said ratio and the detected radiation from the first reference beam to produce an accurate indication of the unknown intensity.

27. A method of measuring radiation from a source having an unknown intensity, comprising the steps of:

isolating monochromatic radiation of variable wavelength from a reference source;

separating the monochromatic radiation from the reference source into first and second reference beams;

detecting radiation from the first reference beam;

directing the second reference beam to one side of a sector mirror and then through a monochromator channel to isolate monochromatic radiation of said variable wavelength;

directing radiation from the source having an unknown intensity to the opposite side of the sector mirror, the mirror periodically replacing the second reference beam being directed through the monochromator channel with radiation from the source having an unknown intensity to produce a combined monochromatic beam having an unknown component and a reference component;

detecting signals respectively representative of the unknown component and the reference component from the combined beam;

forming the ratio between the detected signals representative of the unknown and reference components; and multiplicatively combining said ratio with the detected radiation from the first reference beam to produce an accurate indication of the unknown intensity.

28. A method of measuring radiation from a source having an unknown intensity, comprising the steps of:

isolating monochromatic radiation of variable wavelength from a reference source;

separating the monochromatic radiation into first and second reference beams;

detecting radiation from the first reference beam through the use of a first detector;

directing the second reference beam to one side of a sector mirror and then through the entrance slit of a monochromator channel to isolate monochromatic radiation of said variable wavelength;

directing radiation from the source having the unknown intensity to the opposite side of the sector mirror, the mirror periodically replacing the second reference beam being directed through the entrance slit with radiation from the source having an unknown intensity, to produce a combined monochromatic beam having an unknown component and a reference component at the exit slit of the monochromator channel;

maintaining the exit slit sufficiently wide to prevent radiation entering the entrance slit from the second reference beam from being obstructed by the exit slit;

detecting signals from the combined beam through the use of a second detector, said signals being respectively proportional to the unknown component and the reference component; and combining the detected signals proportional to the unknown and reference components with the detected radiation from the first reference beam to produce an accurate indication of the unknown intensity.

29. A method of measuring radiation from a source having an unknown intensity, comprising the steps of:

isolating monochromatic radiation of variable wavelength from a reference source;

separating the monochromatic radiation into first and second reference beams;

detecting radiation from the first reference beam through the use of a first detector;

depolarizing radiation from the second reference beam;

directing the depolarized radiation to one side of a sector mirror and then through the entrance slit of a monochromator channel to isolate monochromatic radiation of said variable wavelength;

directing radiation from the source having the unknown intensity to the opposite side of the sector mirror, the mirror periodically replacing the depolarized radiation being directed through the entrance slit with radiation from the source having an unknown intensity, to produce a combined monochromatic beam having an unknown component and a reference component at the exit slit of the monochromator channel;

maintaining the exit slit sufficiently wide to prevent depolarized radiation entering the entrance slit from being obstructed by the exit slit;

detecting signals from the combined beam through the use of a second detector, said signals being respectively proportional to the unknown component and the reference component; and combining the detected signals proportional to the unknown and reference components with the detected radiation from the first reference beam to produce an accurate indication of the unknown intensity.

* * * * *